(12) United States Patent
Mukaida (10) Patent No.: US 7,398,807 B2
(45) Date of Patent: Jul. 15, 2008

(54) ENERGY CONSUMPTION EFFICIENCY IMPROVING AGENT AND METHOD, AND ARTICLE HAVING IMPROVED ENERGY CONSUMPTION EFFICIENCY

(75) Inventor: Minoru Mukaida, Shinagawa-ku (JP)

(73) Assignee: Cosmos Chemical Co., Ltd., Shinagawa-Ku (JP)

( * ) Notice: Subject to any disclaimer, the term of this patent is extended or adjusted under 35 U.S.C. 154(b) by 0 days.

(21) Appl. No.: 09/740,345

(22) Filed: Dec. 18, 2000

(65) Prior Publication Data

US 2002/0064645 A1 May 30, 2002

(30) Foreign Application Priority Data

Sep. 29, 2000 (JP) ............................. 2000-298111
Nov. 24, 2000 (JP) ............................. 2000-357474

(51) Int. Cl.
*B32B 9/04* (2006.01)
*B60C 1/00* (2006.01)

(52) U.S. Cl. .................... 152/209.4; 428/447; 428/323; 152/209.5; 152/211

(58) Field of Classification Search ................ 428/323, 428/331, 329, 332; 523/150, 152, 153; 36/98, 36/7.7; 427/204, 205; 152/209.4, 211, 208; 106/36

See application file for complete search history.

(56) References Cited

U.S. PATENT DOCUMENTS

| 3,878,147 | A | * | 4/1975 | Craven ......................... 260/18 |
| 4,501,808 | A | * | 2/1985 | Sakai et al. .................... 430/59 |
| 5,456,744 | A |  | 10/1995 | Fattor .......................... 106/36 |
| 5,603,367 | A | * | 2/1997 | Watanabe ................. 152/209.4 |
| 5,906,885 | A | * | 5/1999 | Yoshimura et al. .......... 428/212 |
| 6,053,226 | A |  | 4/2000 | Agostini ................... 152/209.5 |
| 6,058,994 | A |  | 5/2000 | Amino et al. ............... 152/167 |
| 6,548,573 | B1 | * | 4/2003 | Rempert ..................... 523/209 |

FOREIGN PATENT DOCUMENTS

| JP | 57126877 A | 8/1982 |
| JP | 1229708 A | 9/1989 |
| JP | 11140426 A | 5/1999 |

OTHER PUBLICATIONS

The Encyclopedia of Polymer Science, vol. 3, Nov. 1985, p. 552.*
English Language Abstract For JP11140426.
English Language Abstract For JP1229708.
English Language Abstract For JP57126877.

* cited by examiner

*Primary Examiner*—Holly Rickman (57) ABSTRACT

An energy consumption efficiency improving agent is disclosed which forms a substance having a large adherability to an applying object and a high adherence to a contacting object and greatly reduces energy loss, and attains improvement of an energy consumption efficiency substantially equal to three powers of adhesion improving rate under ordinary use conditions.

11 Claims, 6 Drawing Sheets

ACTUAL DRIVING TEST A

Date of Test・July 10, 2000
Place of Test・Plaza in Chiba City
Road Surface State・Dry Road Surface Paved with Concrete
Driver・A

Time (sec)
Distance (m)
Speed of 40km/h
Quick Start at Constant Accelerator Operation

| Type of Test Car | NISSAN MARCH (E-K11) | | |
|---|---|---|---|
| Engine Swept Volume | 1000CC | | |
| Production Year | 1998 | | |
| Setting | Automatically Air Conditioned at Maximum Level  Car Audio System Turned on  Ordinry Grounding Surface Area of Tires  Fuel Consumption~10km/ℓ  Driving Range of Automatic Gear Shifting | | |
| Application | Not Applied | Applied | Times |
| Time(sec) | 7.0 | 5.5 | 1.21 |
| Distance(m) | 39.9 | 46.2 | 1.16 |
| Driver's Comment | Wheel Slipping did not Occur After Applicattion | | |

Fig.6

ACTUAL DRIVING TEST A

Date of Test · July 10, 2000
Place of Test · Plaza in Chiba City
Road Surface State · Dry Road Surface Paved with Concrete
Driver · A

| Type of Test Car | NISSAN PRIMERA (E-P11) | | |
|---|---|---|---|
| Engine Swept Volume | 1800cc | | |
| Production Year | 1997 | | |
| Setting | Automatically Air Conditioned at Maximum Level   Car Audio System Turned on   Ordinry Grounding Surface Area of Tires   Fuel Consumption~10km/ℓ   Driving Range of Automatic Gear Shifting | | |
| Application | Not Applied | Applied | Times |
| Time(sec) | 5.0 | 4.0 | 1.20 |
| Distance(m) | 30.8 | 34.3 | 1.11 |
| Driver's Comment | Wheel Slipping did not Occur After Applicattion | | |

Fig. 7

ACTUAL DRIVING TEST B

Date of Test · July 10, 2000
Place of Test · Plaza in Chiba City
Road Surface State· Dry Road Surface Paved with Concrete
Driver · A Distance (m)

Speed of 30km/h

Accelerator Operation Discontinued at Speed of 40km/h

| Type of Test Car | NISSAN MARCH (E-K11) | | |
|---|---|---|---|
| Engine Swept Volume | 1000 CC | | |
| Production Year | 1998 | | |
| Setting | Automatically Air Conditioned at Maximum Level    Car Audio System Turned on<br>Ordinry Grounding Surface Area of Tires    Fuel Consumption~10km/ℓ<br>Driving Range of Automatic Gear Shifting | | |
| Application | Not Applied | Applied | Times |
| Distance(m) | 104.3 | 119.7 | 1.15 |
| Driver's Comment | Wheel Slipping did not Occur After Applicattion | | |

Fig.8

ACTUAL DRIVING TEST B

Date of Test · July 10, 2000
Place of Test · Plaza in Chiba City
Road Surface State· Dry Road Surface Paved with Concrete
Driver · A Distance (m)
Speed of 30km/h
Accelerator Operation Discontinued at Speed of 40km/h

| Type of Test Car | NISSAN PRIMERA (E-P11) | | |
|---|---|---|---|
| Engine Swept Volume | 1800cc | | |
| Production Year | 1997 | | |
| Setting | Automatically Air Conditioned at Maximum Level  Car Audio System Turned on  Large Grunding Surface Area of Tires  Fuel Consumption~9km/ℓ  Driving Range of Automatic Gear Shifting | | |
| Application | Not Applied | Applied | Times |
| Time(sec) | 139.3 | 170.8 | 1.23 |
| Driver's Comment | Acceleration Improved After Application  Wheel Slipping did not Occur After Applicattion | | |

ENERGY CONSUMPTION EFFICIENCY IMPROVING AGENT AND METHOD, AND ARTICLE HAVING IMPROVED ENERGY CONSUMPTION EFFICIENCY

BACKGROUND OF THE INVENTION

1. Field of the Invention

The present invention relates to improving an energy consumption efficiency generally typified by the concept of a fuel consumption or the like, and more particularly to an energy consumption efficiency improving agent which is applied to a surface to be brought into contact with ground (hereinafter referred to as "grounding surface") of a tire of a vehicle, a footwear, and so on. Further, the present invention also relates to an energy consumption efficiency improving method and an article improved in energy consumption efficiency.

2. Related Background Art

Hitherto, especially after the so-called first oil shock in 1973, automakers have made efforts to improve the energy consumption efficiency of autos generally typified by the concept of fuel consumption or the like as the most important issue, and it is well known that American, Japanese and European automakers have recently paid attention to the improvement of the fuel consumption, etc. as an issue of protection of the globe environment. It has hitherto been said that in the case of vehicles, the major factors affecting the fuel consumption and their contribution rates are the rolling resistance of tires (contribution rate: ⅓), the frictional resistance in a power plant including an engine (contribution rate: ⅓), and the air resistance of a body (contribution rate: ⅓), although the distribution rates greatly vary depending on the drive speed, and so on. Thus, the automakers have dealt with the respective major factors in various manners to improve the fuel consumption.

For example, means for reducing the rotation resistance of tires includes reducing the number of grooves provided in the tire surface, using a hard rubber material for tires, or reducing the car body weight to decrease hysteresis loss due to deformation of the tire rubber during traveling (or driving); means for reducing the frictional resistance of the power plant includes changing the fuel injection method to improve the engine combustion efficiency or changing the structure of a rotation transmission section to increase the power transmission efficiency; and means for reducing the air resistance of the body includes designing the appearance of a car body or an outer attachment such as a side mirror in a shape with less air resistance.

However, although these means for improving fuel consumption are large in scale, their fuel consumption improving effect is insufficient.

On the other hand, in order to make the consumption of physical energy as less as possible when a man travels a long distance by a bicycle or walks or runs on a long distance with a footwear such as shoes, bicycle makers, shoemakers, or the like have made efforts to reduce the weight of bicycle, shoes, etc. or changed the material, shape, structure, etc. of a grounding surface of a bicycle tire, shoes, etc., thereby improving the adhesion to the ground.

As described above, the conventional means for improving energy consumption efficiency such as fuel consumption includes large scale means such as reduction in a car body weight, change of a tire shape, a fuel injection method, or a power transmitting method, etc. and relies on the effort of automakers, bicycle makers, shoemakers, and so on. If a consumer oneself wishes to improve energy consumption efficiency such as fuel consumption, he will have to replace his car or a component thereof such as a tire with a new car or component improved in energy consumption efficiency, which will result in considerable disbursement. Further, when a consumer uses, e.g., tires with less grooves as means for reducing the rolling resistance of tires for the purpose of improving energy consumption efficiency, the use of such tires exhibits the effect of improving the energy consumption efficiency such as fuel consumption on a dry road surface in a fine weather. However, the use of such tires in a rainy weather, or on a wet or frozen road surface will give rise to a slip and is dangerous, so that it is necessary to replace such tires with tires having a sufficient number of grooves formed in their surfaces. This forces the consumer to select and adopt a suitable means for improving the energy consumption efficiency depending upon the use environment, which necessitates considerable labor, expense, and the like. Therefore, simple, inexpensive means for improving the energy consumption efficiency such as fuel consumption that is available for an ordinary consumer is limited to, for example, paying attention so as not to be involved in traffic congestion, or avoiding unnecessary acceleration when driving a car.

Further, when a man travels a long distance on a bicycle or walks or runs on a long distance with a footwear such as shoes, the countermeasure for avoiding unnecessary consumption of physical energy is limited to buying and use of a bicycle, shoes, etc. having a light weight and good adhesion to a road surface, which also necessitates a great expense.

SUMMARY OF THE INVENTION

The present invention has been accomplished to solve the above mentioned problems of the prior art.

An object of the present invention is to provide an energy consumption efficiency improving agent which is to be applied to a grounding surface of a tire of a vehicle, a footwear, etc. to exhibit a significantly high energy consumption efficiency improving effect for a long period of time.

Another object of the present invention is to provide an energy consumption efficiency improving method using the energy consumption efficiency improving agent and an article improved in energy consumption efficiency.

DESCRIPTION OF THE PREFERRED EMBODIMENTS

First, the theory and mechanism on which the energy consumption efficiency improving agent according to the present invention improves the energy consumption efficiency and solves the above mentioned prior art problems will be described.

Generally, although a frictional force at a portion in contact with an article is apt to be considered to increase the energy consumption, a frictional force under some conditions will reduce the energy consumption. That is, it can be said that a frictional force not accompanied with energy loss at a contact portion (e.g., grounding portion) of a rotating member or the like with another member rather has a function of turning into an energy transmitting force to reduce the energy consumption in energy transmission. Specifically, the relationship of [frictional force at contacting portion]≈[adhesion]≈[energy transmitting force] holds. Hitherto, as means for generating a frictional force of a rotating member or the like with regard to a contacting object, there have been adopted use of an flexible elastic body for the rotating member body or the like, provision of grooves in a surface of the rotating member and the like.

However, since these means are accompanied with an energy loss resulting from deformation, expansion, contraction, or the like of the elastic body or grooves, the energy transmitting force decreases, so that the energy consumption becomes large on the contrary. That is, in order to completely convert the frictional force (adhesion) of a rotating member or the like with regard to a contacting object into an energy transmitting force, it is necessary to prevent such energy loss from being generated. In summary, the relationship that the increase of a frictional force without energy loss results in the increase of adhesion without energy loss, which in turn results in the increase of energy transmitting force is established. This is considered to mean the reduction in the rolling resistance in the case of traveling by a car or the like. The rolling resistance of a car variously changes depending on the combination in various rates of the components of the traveling pattern such as accelerated traveling, constant speed traveling, inertial traveling, and decreasing speed traveling, the traveling environment (the state of a road surface, the state of tires, the character of a driver, etc.) or the like, but improving adhesion at a contacting portion of a tire with a road surface without energy loss decreases and improves the rolling resistance in proportion thereto. Further, the improvement of the rolling resistance increases and improves the traveling distance with a given energy at the same rate as the improvement of the adhesion, and the extension of the traveling distance reduces the number of accelerator operations of the car to attain an improvement at the same rate as the improvement of the adhesion. That is, the relationship of [energy consumption efficiency improvement resulting from improvement in adhesion without energy loss]≈[improvement in rolling resistance]×[improvement in traveling distance]×[improvement in number of accelerator operations]≈[improvement in adhesion (frictional force)]$^3$ holds. Of course, it is believed that this relationship varies depending on the above mentioned traveling environment of the car or the like, but is expected to attain [improvement in rolling resistance]≈[improvement in adhesion]$^1$ at the minimum and [improvement in rolling resistance]×[improvement in traveling distance]×[improvement in number of accelerator operations]≈[improvement in adhesion]$^3$ at the maximum, under ordinary traveling conditions such as road conditions, driving manner, etc.

The present invention has been accomplished based on the above described theory and mechanism and provides an energy consumption efficiency improving agent which is applied to an object to form a thin film of a viscosity of 100,000 cp or less and a thickness of 10 μm or less on a surface of the object.

Further, the present invention provides an energy consumption efficiency improving agent comprising a mixture of a flexible polymer binder that has a viscosity of 100,000 cp or less and adheres to an organic material and an inorganic material, and a solution-forming agent necessary to make the viscosity of the mixture 100 cp or less.

Moreover, the present invention provides an energy consumption efficiency improving agent comprising a mixture of a flexible polymer binder which has a viscosity of 100,000 cp or less and adheres to an organic material and an inorganic material, an antislipping agent comprising fine particles of an average particle diameter of 10 μm or less, and a solution-forming agent necessary to make the viscosity of the mixture 100 cp or less.

In addition, the present invention provides an energy consumption efficiency improving method, comprising applying the energy consumption efficiency improving agent to an object to form a thin film of a viscosity of 100,000 cp or less and a thickness of 10 μm or less on a surface of the object.

Further, the present invention provides an article improved in energy consumption efficiency having a contact surface to be brought into contact with a surface of a support, and a thin film on the contact surface formed by applying the energy consumption efficiency improving agent, the film having a viscosity of 100,000 cp or less and a thickness of 10 μm or less.

In the claims and specification, the term "support" is intended to mean a body on a surface of which a product such as a vehicle, a man or the like moves, such as a road or passage paved with asphalt, concrete, tiles, etc., ground, a floor of a building, a metal plate, a resin plate, or the like, but is not limited thereto.

Further, the article having a surface (i.e., contact surface) to be in contact with a surface of the support includes an article used when a man or a product moves, such as a tire of an vehicle, a footwear, or the like but is not limited thereto.

When the energy consumption efficiency improving agent of the present invention is applied to an object, a very thin film of a thickness of 10 μm or less is formed on a surface of the object which has a low viscosity of 100,000 cp or less and remarkably increases the adhesion of the surface of the object to a surface of another article, thus significantly reducing the energy loss such as hysteresis loss, slip loss, etc. during movement, so that the energy consumption efficiency when a man or vehicle moves is improved for a long period of time.

The range of viscosity of a film formed on a surface of an object by the present improving agent is preferably 100,000 cp to 10,000 cp, more preferably 50,000 cp to 10,000 cp, and most preferably 20,000 cp to 10,000 cp. The reason for this is that the lower the viscosity, the more difficult the peeling off of the film from the article due to an external force.

The range of thickness of a film formed on a surface of an object by the present improving agent is preferably 10 μm to 0.01 μm, more preferably 1 μm to 0.01 μm, and most preferably 0.1 μm to 0.01 μm. The reason for this is that the smaller the film thickness, the less the hysteresis loss and the stress concentration, thus exhibiting a large adhesive force. Further, a slip loss due to the film in a specific mutual relationship such as a high speed of another article with regard to the applying object is difficult to occur, thus reducing the danger due to slipping.

Means for applying the present improving agent to a surface of an object preferably includes, but is not limited to, coating with a blush, spraying, etc., dipping of the object in the improving agent.

When applied, the improving agent does not necessarily need to be applied in the form of a mixture, it is possible to apply each component of the mixture to a surface of an object separately or in partial combination and then to form the mixture of the separately applied components on the surface of the object.

Other methods of applying the present improving agent to an object and forming a thin film on its surface include, for example, a method of incorporating microcapsules containing the improving agent to a material for forming an object such as tire or shoes, forming the object, and allowing the microcapsules to be destroyed by an external force applied to the object on contact with ground or the like, thereby always forming an thin adhesive film with less energy loss on the surface of the object, a method of incorporating an antislipping agent impregnated with the improving agent to a material for forming an object such as tire or shoes and forming the object, thereby always forming an thin adhesive film with less energy loss on the surface of the object, and the like. These methods make it possible to improve energy consumption efficiency without supplementing the improving agent until a surface portion of the object has completely worn to be lost.

In the present invention, when a low viscosity liquid improving agent of a viscosity of 100 cp or less obtained by mixing a flexible polymer binder which has a viscosity of 100,000 cp or less and adheres to an organic material with a solution-forming agent necessary to make the viscosity of the mixture 100 cp or less is applied to a grounding surface of a tire, shoes, etc. so as to deposit a flexible thin film of a thickness of 10 µm or less throughout on the surface, the liquid improving agent having the very low viscosity permeates throughout the whole of the numerous fine irregularities (unevennesses) of the grounding surface by the capillary action. Even when the thickness is 10 µm or less, in the use under special conditions where the grounding surface is brought into contact with ground at a high speed traveling or the like, the possibility of generation of a slip increases with the increase of the thickness, so that the danger increases.

After the improving agent has permeated into the irregularities, the solution-forming agent will naturally vaporize or be washed away by water on a road surface, so that a flexible thin film having a viscosity of 100,000 cp or less and a thickness of 10 µm or less strongly adheres to the whole of the fine irregularities of the grounding surface of the tire, shoes, etc. and will not perfectly harden during its lifetime.

The range of viscosity of the mixture solution of the improving agent according to the present invention is preferably 100 cp to 20 cp, more preferably 50 cp to 20 cp, and most preferably 35 cp to 20 cp. The reason for this is that the lower the viscosity, the more easily the mixture permeates into the fine irregularities of the grounding surface by the capillary action.

As the base material of the viscous flexible polymer binder which adheres to an organic material and an inorganic material used in the present invention, there may be included at least one selected from the group consisting of polyethylene; a methyl, phenyl, chloro, hydroxy, acetoxy, or cyano derivative of polyethylene; polybutadiene, a methyl or chloro derivative of polybutadiene; a copolymer of the polyethylene derivative and the polybutadiene derivative; silicone; polysulfide; polyurethane; modified silicone; silicone, polysulfide, polyurethane, modified epoxy resin, or modified acryl resin generated by condensation action of an external substance such as water during adhesion. Of the binders mentioned above, the more preferred is polyurethane and modified silicone and the most preferred is modified silicone. This is because the modified silicone will cause condensation polymerization action by water in air, rain, etc. to strongly adhere to a wet object.

As the solution-forming agent used in the present invention, there may be included a solvent which is capable of diluting the binder including a solvent which dilutes the binder by colloid formation, such as alcohols including methyl alcohol or isopropyl alcohol. Of the solution-forming agents mentioned above, the more preferred is propyl alcohol and methyl alcohol, and the most preferred is methyl alcohol. This is because the influence on a human body is small.

With the present improving agent, a flexible thin film adhering to a surface of an object improves the adhesion to a road surface which is dry or wetted by rain, etc. In the present invention, it is also possible to add to the above mentioned improving agent an antislipping agent comprised of fine particles of an average diameter of 10 µm or less as a further component and mixing the whole to form a coating fluid having a low viscosity of 100 cp or less. When the coating fluid is applied to a grounding surface of a tire, shoes, etc. so as to deposit a flexible thin film of a thickness of 10 µm or less throughout on the surface, the flexible thin film of a thickness of 10 µm or less formed as mentioned above in combination with the antislipping agent provides an energy consumption efficiency improving means that can cope with all road surface states including a dry road surface, a wet road surface in rain or snow, a wet, frozen road surface, etc. Even when the thickness is 10 µm or less, in the use under special conditions where the grounding surface is brought into contact with ground at a high speed traveling or the like, the possibility of generation of a slip increases with the increase of the thickness, so that the danger increases.

The exact mechanism is not fully understood but is believed as follows. In preparation of the mixture of the improving agent containing the antislipping agent, after the antislipping agent and a large amount of the solution-forming agent have been mixed to form a low viscosity liquid, a slight amount of the binder capable of forming a flexible thin film on deposition to a grounding surface of a tire, shoes, etc. is added with mixing, so that the binder adhering to the surface of the antislipping agent forms a very thin film. When the polymer binder capable of forming a flexible, viscous film which adheres to an organic material and an inorganic material by an condensation action of an external substance such as water during adhesion is further added as a component of the mixture, the binder will cause the condensation reaction after adherence to the grounding surface of the tire or footwear, so that the film will not cover the entire surface of the antislipping agent. As a result, the antislipping agent itself having a surface partially exposed through the film is brought into direct contact with the road surface to exhibit improved adhesion and slip resistance to the road surface or water surface.

In the present invention, preferred materials for the antislipping agent includes, for example, a finely particulate inorganic material mainly comprised of silicon oxide, aluminum oxide, cerium oxide, or silicon carbide, or a finely particulate organic material such as a ground nutshell of a walnut. Of the materials, the more preferred is aluminum oxide and silicon oxide, and the most preferred is silicon oxide. This is because particles of small diameters are commercially available at a low cost. Further, the range of the average diameter of fine particles of the antislipping agent is preferably 10 µm to 10 nm, more preferably 1 µm to 10 nm, and most preferably 100 nm to 10 nm. This is because its adhesive force is large and peeling off is difficult to be occurred.

[Action]

The energy consumption efficiency improving agent of the present invention strongly adheres throughout to the numerous fine irregularities of a contacting surface such as a grounding surface of a tire of a car, footwear, or the like; when a man drives or walks on a road surface which is harder than the antislipping agent, the flexible thin film formed on the grounding surface functions so as to improve the adhesion to the road surface; when a man drives or walks on a road surface which has the same hardness as or a smaller hardness than the antislipping agent, the flexible thin and the antislipping agent together function so as to improve the adhesion to the road surface; and when a man drives or walks on a frozen, wet road surface, the antislipping agent functions so as to improve the adhesion to the road surface. Further, since the formed film is thin and the antislipping agent is constituted of fine particles, there is substantially no energy loss such as hysteresis loss, slip loss, etc., so that a significantly great energy consumption efficiency improving effect is exhibited.

Further, when a grounding surface of a tire of a car, a footwear, etc. has been worn down to lose its grooves, since the grounding surface area increases, the energy loss decreases and the adhesion increases as compared with the state before the wearing down of the grounding surface, so that the energy consumption efficiency improving effect further increases. In addition, since the improving agent of the present invention strongly adhering to a grounding surface of a tire of a car, a footwear, etc. will not harden completely during its life, form a flexible, low-viscosity film which may be almost liquid, and adhere throughout to the fine irregularities of the grounding surface, even when applied with a considerably large external force by the road surface during driving or walking, the film is very difficult to be peeled off and exhibits an energy consumption efficiency improving effect for a surprisingly long period of time. This can be understood from the general fact that when a highly adhesive material that has a very low viscosity and is nearly liquid when left to stand for a long period of time is made to adhere to an article, the material can not completely be removed off even when rubbed strongly.

EXAMPLES

Figure 1:
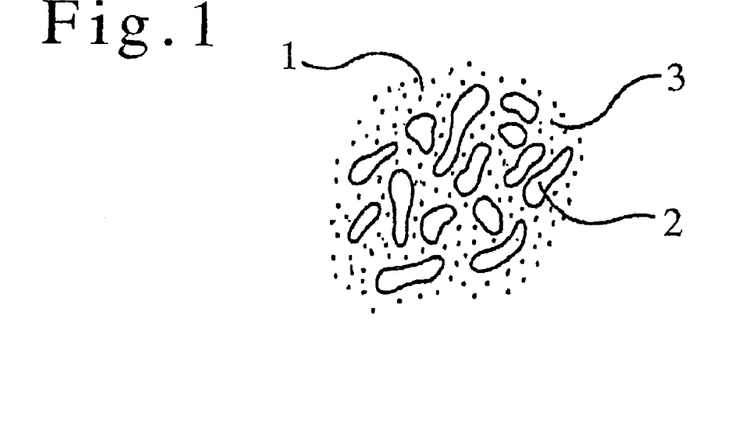
FIG. 1 is an enlarged schematic plan view of a grounding surface of a tire or shoes.
Figure 2:
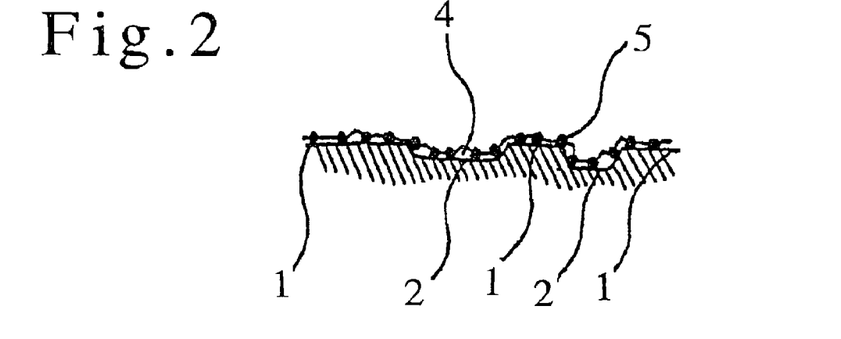
FIG. 2 is an enlarged schematic sectional view of a grounding surface of a tire or shoes.

The energy consumption efficiency improving agent, the energy consumption efficiency improving method using the improving agent and the article improved in energy consumption efficiency by use of the improving agent in accordance with the present invention will be described in detail below with reference to the following examples and the attached drawings, in which FIG. 1 is an enlarged schematic plan view of a grounding surface of a tire or shoes and FIG. 2 is an enlarged schematic sectional view of a grounding surface of a tire or shoes. In the following examples, the unit "%" means "% by weight" unless otherwise noted.

Example 1

| | |
|---|---|
| Heterofunctional group (amino group, 1 × alkoxy group) modified silicone oil | 1.42% |
| Fine particulate silica (particle diameter: 70 nm) | 3.77% |
| Denatured alcohol | 94.81% |

First, the fine particulate silica 5 and the denatured alcohol were mixed with each other at room temperature to form a solution of a very low viscosity. The mixture was left to stand for 10-15 minutes to allow the denatured alcohol to be absorbed by the fine pores of the surface of the fine particulate silica 5, and the heterofunctional group modified silicone oil (viscosity: 8000 cp) 4 was added thereto with stirring. When the mixture solution was left to stand for a long period of time, the fine particulate silica 5 was deposited to effect solid-liquid separation. However, since the particles of the silica 5 were very fine and stirring the solution again soon caused uniform dispersion, the solution was applied to an object in the dispersed state.

The heterofunctional group modified silicone oil 4 used in the present example contains amino groups as the functional group capable of binding with an organic material of a grounding surface 1 of a tire or shoes and alkoxy groups as the condensation group capable of chemically binding with the fine antislipping agent silica 5 as an inorganic material. In the present example, the amino groups provide a flexible film of a viscosity of about 10,000-20,000 cp when bound. A slight amount of the heterofunctional group modified silicone oil 4, the fine particulate silica 5 and a large amount of the denatured alcohol were mixed with one another to form a liquid mixture of a low viscosity of about 30 cp, and the mixture was applied to a grounding surface 1 of a tire or shoes so as to deposit a flexible thin film of a thickness of several nm or less throughout on the surface. Since the mixture was low viscosity liquid and the silica 5 was fine, the mixture deeply permeated into not only protrusions but also fine recesses 2 (width: 20-30 μm; length: about 500 μm; depth: about 50 μm) by the capillary action to be applied.

Further, the heterofunctional group modified silicone oil 4 in the mixture strongly chemically bonded flexibly to the grounding surface 1 of a tire or shoes by the action of the amino groups contained therein, and the fine particulate silica 5 reacted with the alkoxy groups of the heterofunctional group modified silicone oil 4 by moisture in air or water such as rain, snow, etc. on a road surface to effect strong chemical bonding. Moreover, the alkoxy groups allow molecules of the heterofunctional group modified silicone oil 4 to bond to each other by condensation with a crosslinking reaction by the action of water such as moisture in air, rain or snow on a road surface, thereby allowing the whole mixture to adhere very strongly to the fine irregularities of the grounding surface 1 of a tire or shoes.

As described above, the mixture was prepared by firstly mixing the fine particulate silica 5 with the solution-forming agent to form the solution of the low viscosity and then adding the heterofunctional group modified silicone oil 4 capable of forming a flexible thin film (viscosity: 10,000 cp) on application to the grounding surface 1 of a tire or shoes. When the mixture solution was applied to the grounding surface 1, the slight amount of heterofunctional group modified silicone oil 4 formed a very thin film (thickness: several nm), and the heterofunctional group modified silicone oil 4 adhered to the grounding surface 1 of a tire or shoes effected condensation, so that the film did not cover the entire peripheral (or outer) surface of the fine particulate silica 5 and a part of the fine silica 5 was exposed through the film, whereby not only the flexible film but also the fine particulate silica 5 itself were in contact with the road surface.

Further, the large amount of denatured alcohol in the mixture, after having caused the heterofunctional group modified silicone oil 4 and the fine particulate silica 5 to penetrate deeply into the fine irregularities of the grounding surface 1 of a tire or shoes by the capillary action, evaporated or dissolved in water on the road or the like to flow away. Finally, the heterofunctional group modified silicone oil 4 which forms the extremely flexible film strongly adhering to the grounding surface of a tire or shoes and the extremely fine silica 5 partially exposed through the film complementarily improved the adhesion to the road surface depending on the state of the road surface. Moreover, since the adhering film was flexible, and since the silica 5 was very fine, there was substantially no hysteresis loss, so that the significantly high fuel and energy consumption efficiency improving effect was attained as described below.

Figure 3:
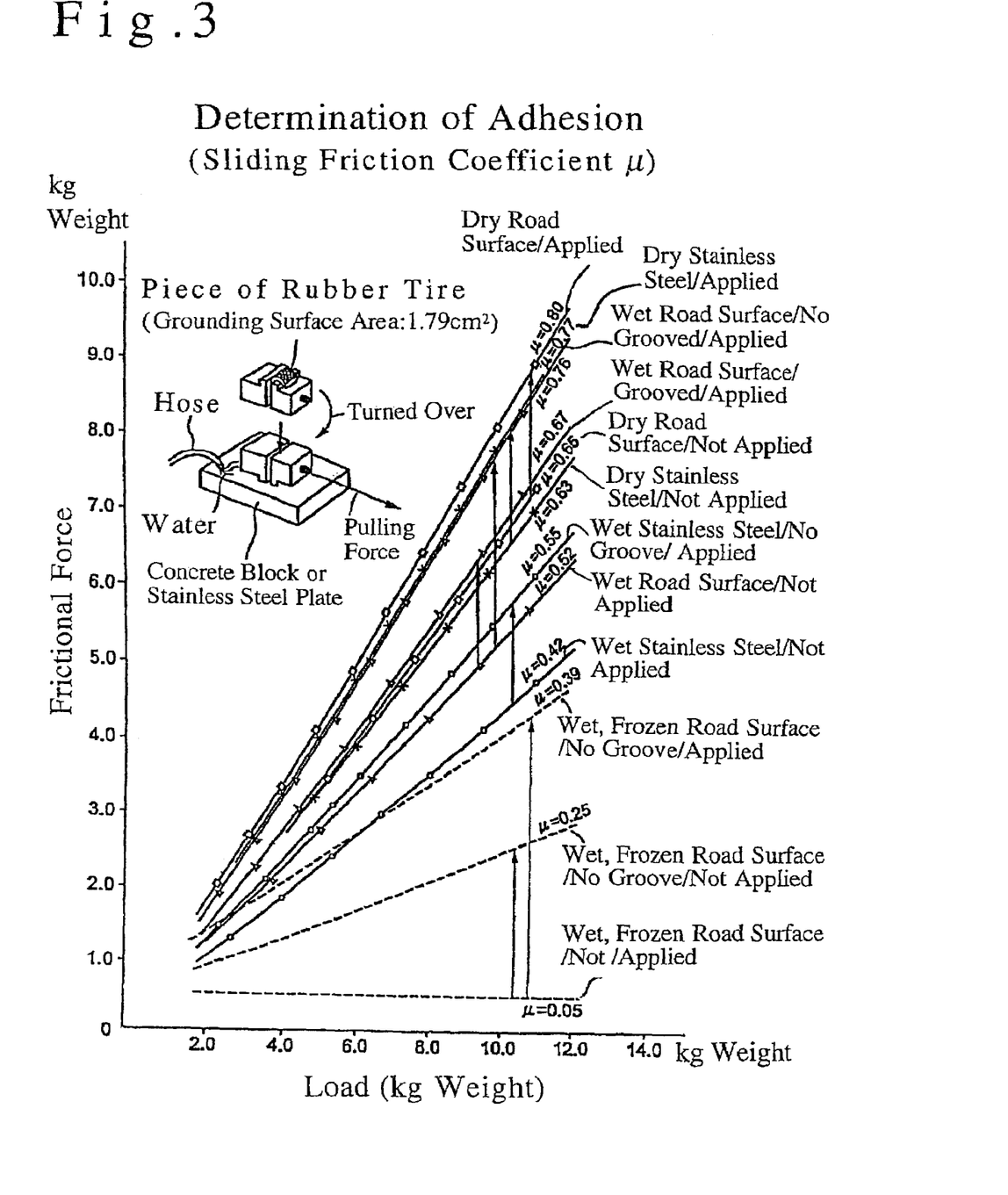
FIG. 3 is a graph illustrating the relationship between a load and a frictional force.

Next, the results of determination of the adhesion to a road surface (sliding friction coefficient μ) between the case where the present improving agent was used and the case where no improving agent was used under various road surface conditions are shown together with the manner of the determination in the load vs. frictional force relational view of FIG. 3.

Specifically, a piece of a rubber tire of a grounding surface area of 1.79 cm² with or without grooves was attached to a lower surface of a weight such that the grounding surface of the tire faces outside; the improving agent of the present invention was then applied to the grounding surface as the occasion demanded; the weight was forced to slide on a concrete block or stainless steel plate optionally frozen or wetted with water supplied through a hose such that the grounding surface of the tire piece was in contact with the surface of the concrete block or stainless steel plate; and the frictional force was determined.

It is seen from FIG. 3 that when the improving agent of the present example is used, extremely high adhesion to the road surface is exhibited independently of the use environment such as the degree of dryness or wetness of the road surface and the material (e.g., stainless steel, concrete, ice) of the road surface (i.e., under almost all use conditions), as compared with the case where no improving agent is used. Further, it is seen that when the present improving agent is applied on the grounding surface of a tire of a car or shoes, the adhesion is larger in a grounding surface that has been worn down and lost grooves than a grounding surface with grooves. Moreover, the adhesion improving effect in the case where the present improving agent is used as compared with the case where no improving agent is used has been determined in each of a wet, frozen road surface, a wet road surface and a dry road surface. As a result, it is seen that the adhesion improving effect has been highest in the wet, frozen road surface and decreases in the order of the wet road surface and the dry road surface.

Next, the correlation between the adhesion of a grounding surface 1 of a tire or shoes to a road surface and the energy consumption efficiency improving effect will be described below based on a view illustrating the tire grounding surface vs. driving force relationship shown in FIG. 4, the results of actual driving test A shown in FIGS. 5 and 6, and the results of actual driving test B shown in FIGS. 7 and 8.

Figure 4:
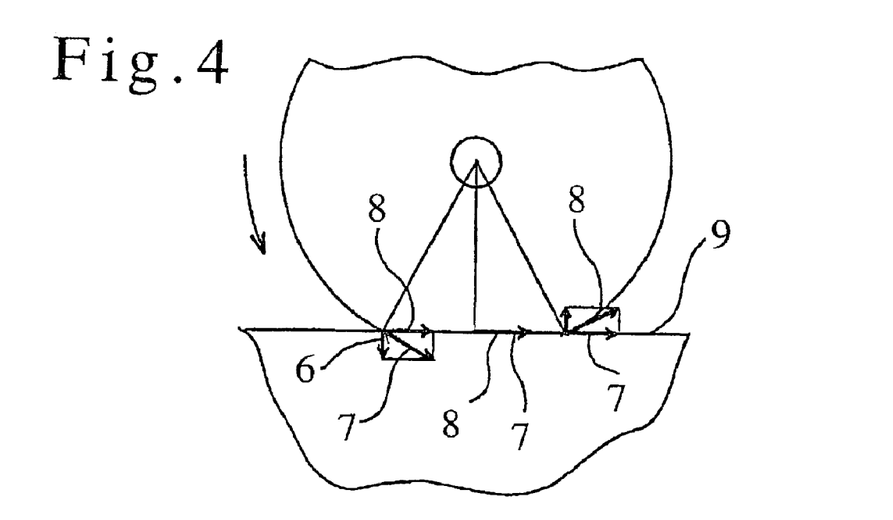
FIG. 4 is a view illustrating the relationship between a grounding surface of a tire and a driving force of the tire.

As shown in the tire grounding surface vs. driving force relational view of FIG. 4, the energy generated by explosion of a fuel in an engine is transmitted through a transmission mechanism to a driving tire to exert a tire driving force 8 and a component force of the tire driving force 8 in a direction parallel to a road surface 9 forms a forward driving force 7.

However, actually, all of the forward driving force 7 is not utilized as an ahead power of the car but is utilized in a proportion corresponding to the magnitude of the above mentioned adhesion (sliding friction coefficient μ) to the road surface.

Figure 5:
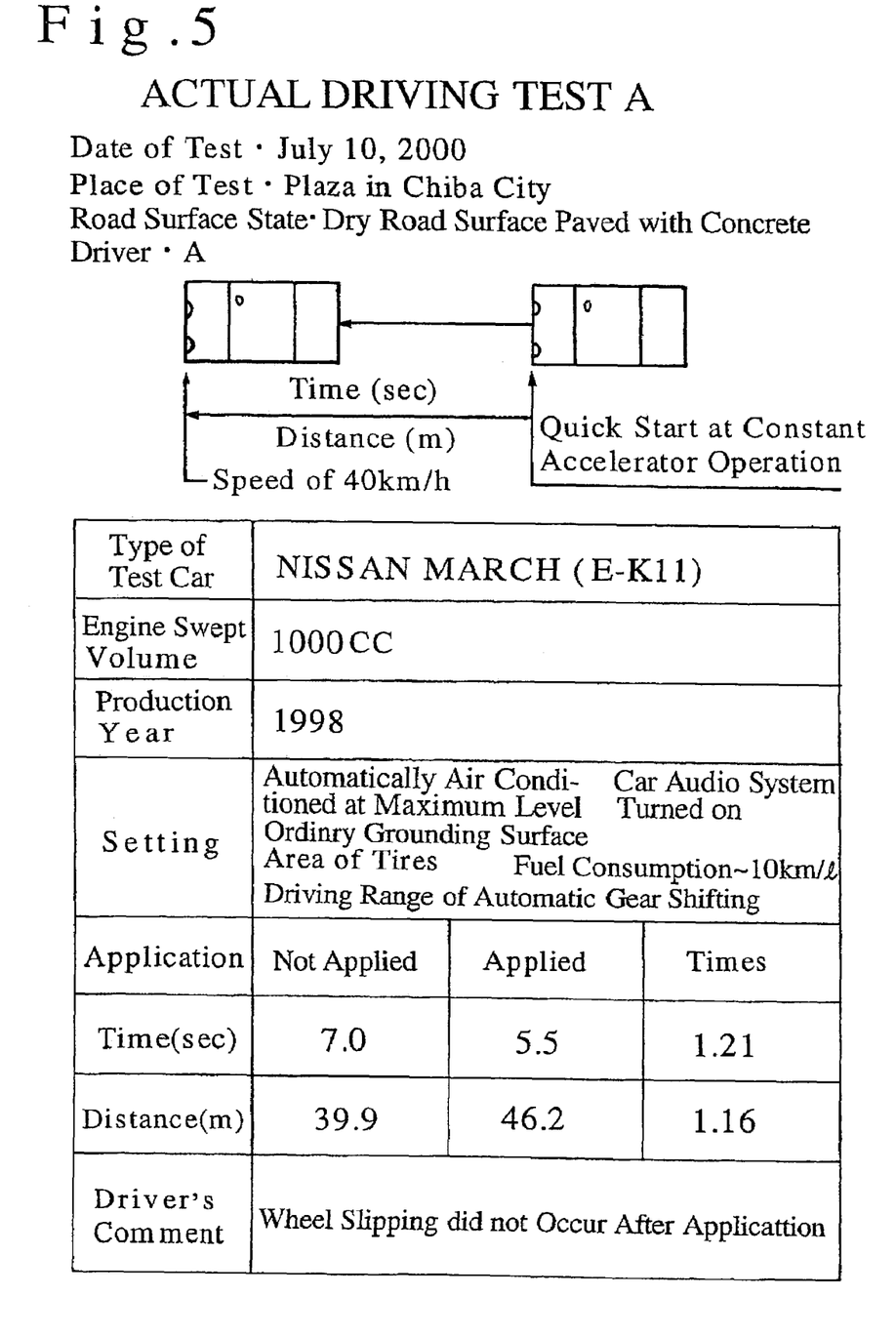
FIGS. 5 and 6 are views showing the results of actual driving test A.
Figure 6:
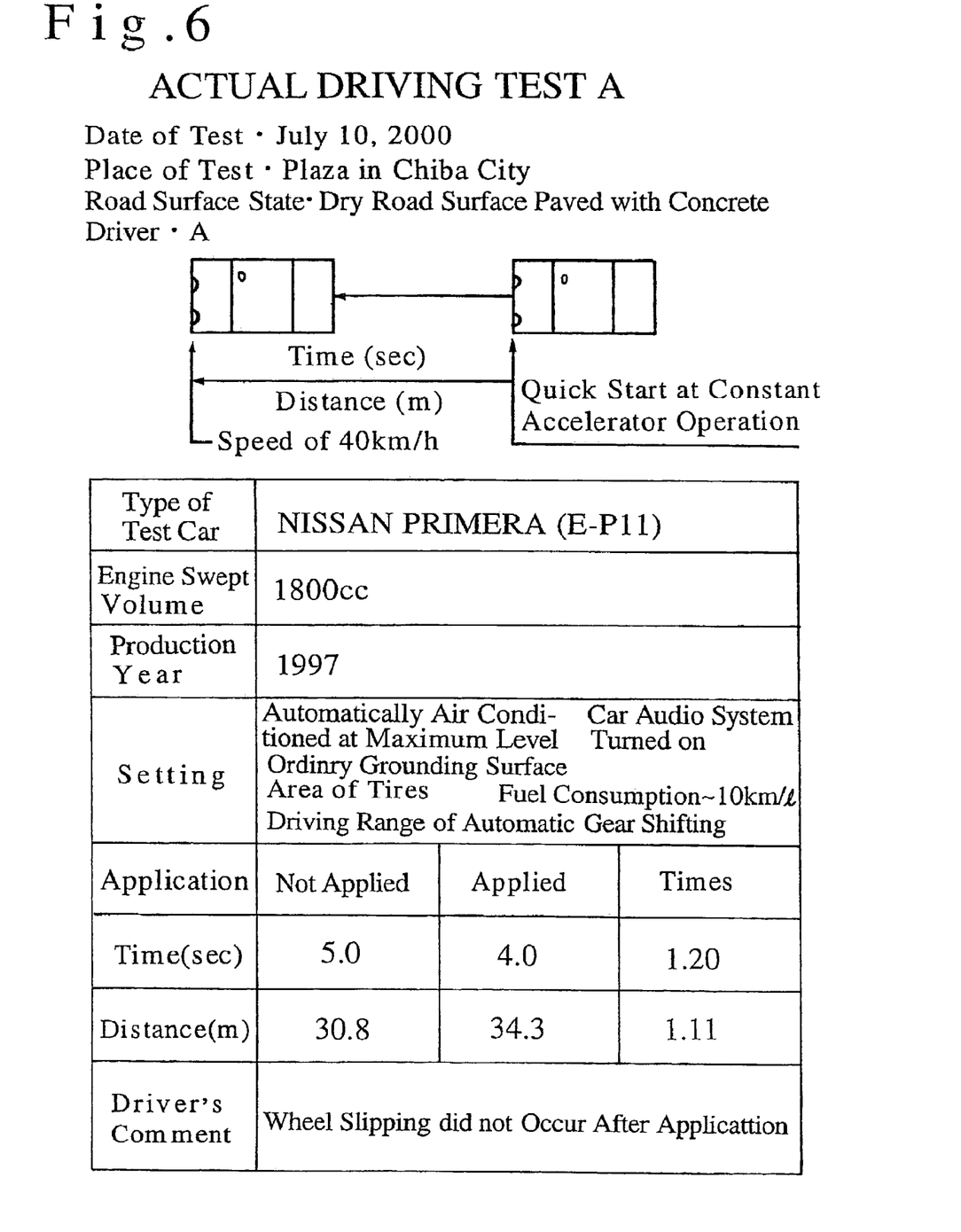
Figure 7:
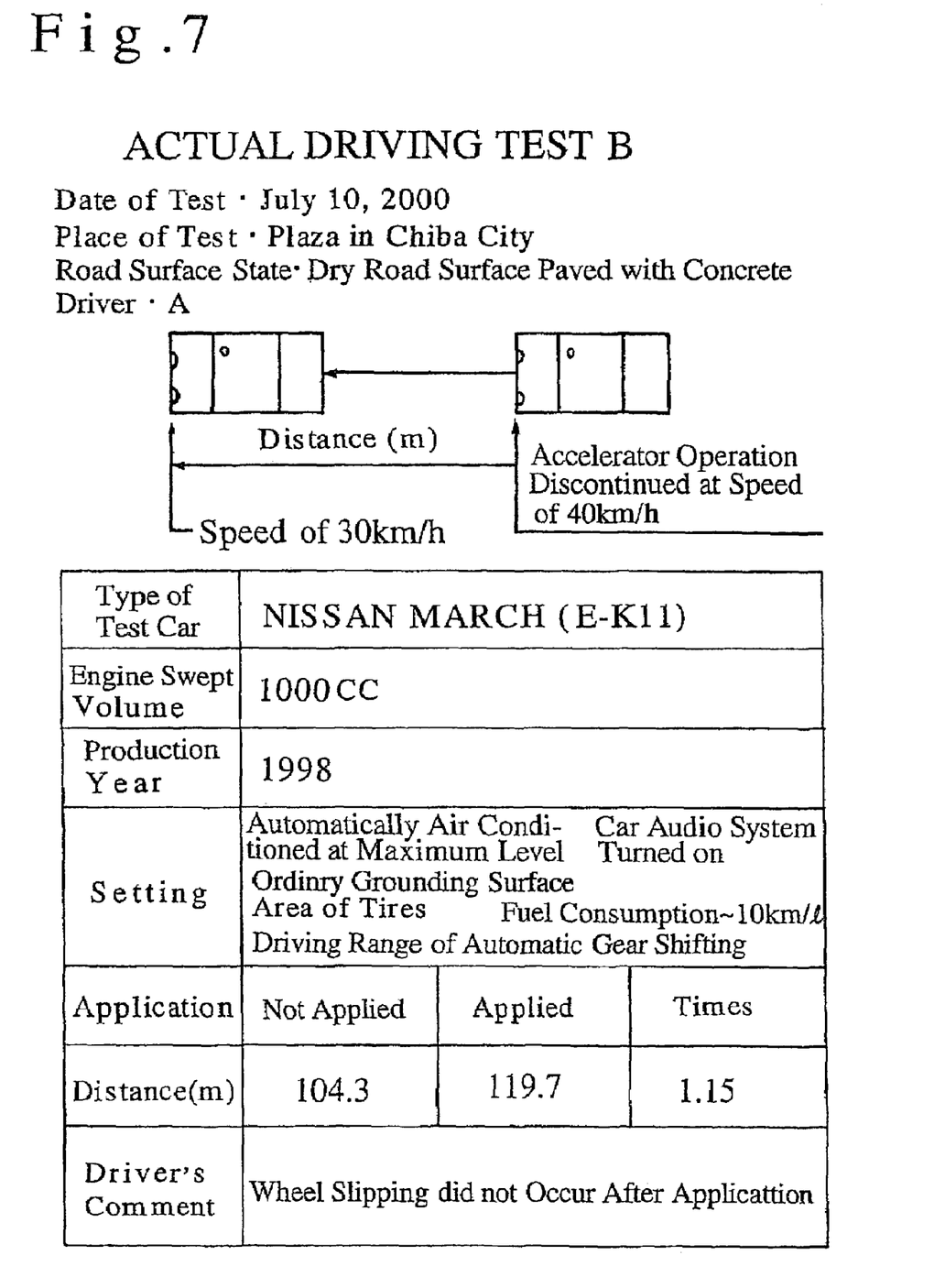
FIGS. 7 and 8 are views showing the results of actual driving test B.
Figure 8:
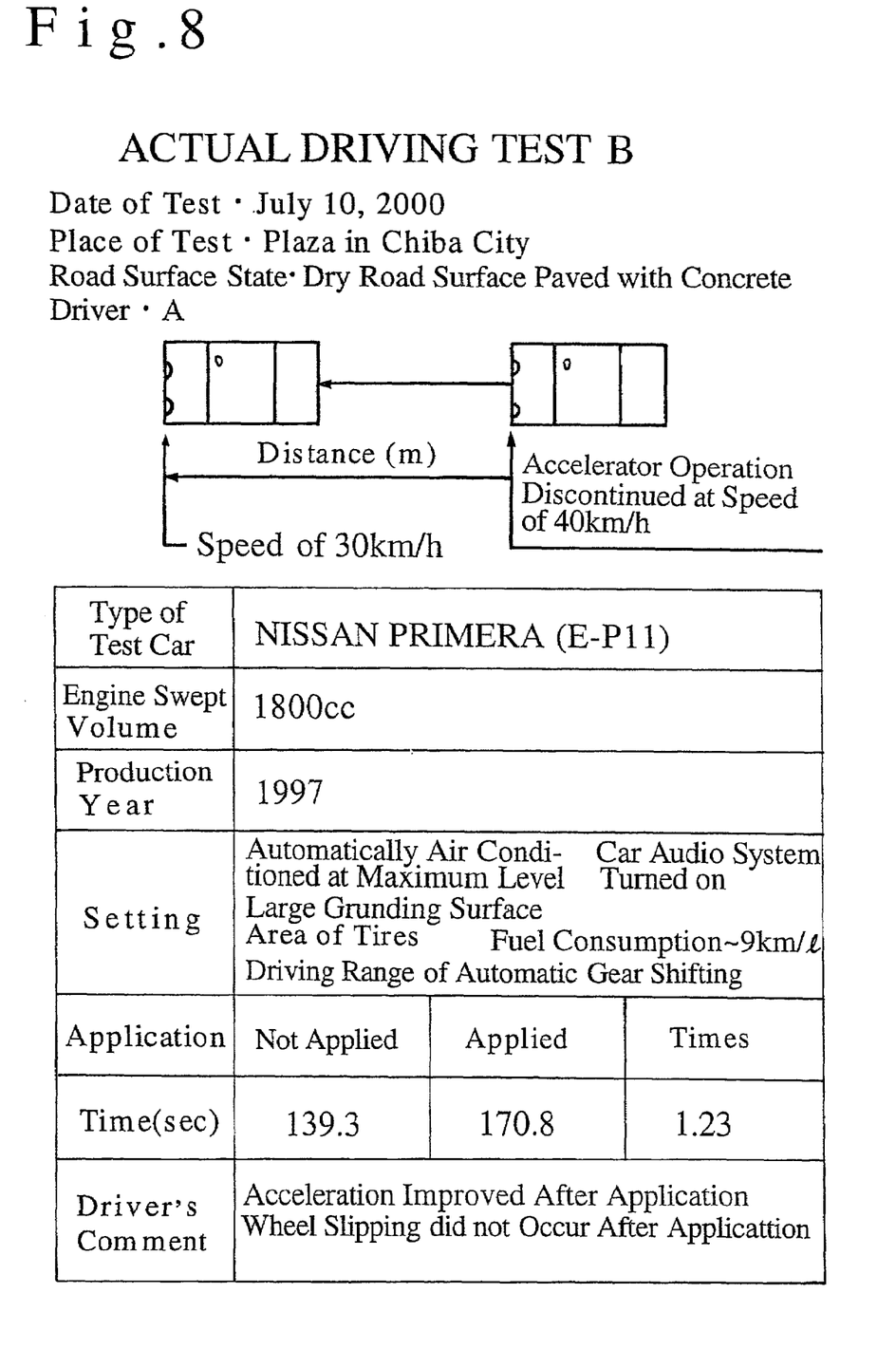

The results of actual driving test A shown in FIGS. 5 and 6 have been obtained by comparing the traveling time and distance from quick start of a car at a constant operating degree of an accelerator to attainment of a traveling speed of 40 km/h between the case where the present improving agent is used and the case where no improving agent is used; the results of actual driving test B shown in FIGS. 7 and 8 have been obtained by adjusting the traveling speed at 40 km/h during driving of a car, then discontinuing the operation of the accelerator, and determining the traveling distance by an inertia force until the traveling speed naturally decreases down to 30 km/h between the case where the present improving agent is used and the case where no improving agent is used; and the overall fuel consumption improving results shown by the results of the actual driving tests A and B are shown in TABLE 1. In the driving tests A and B, the improving agent was applied to only front wheels (driving wheels).

When considering the improvement in fuel consumption from the viewpoint of the utilization of a fuel in comparison between the case where an improving agent is used and the case where no improving agent is used, the shorter the accelerator operating time required to reach a given traveling speed, otherwise the longer the traveling distance after discontinuing operation of the accelerator at a given traveling speed, the more highly the fuel consumption has been considered to be improved. The reduction of the accelerator operating time, the extension of the traveling distance, the reduction of the number of accelerator operations are in proportion to some extent to the magnitude of the adhesion of the tire to a road surface, which supports the above mentioned fact that the improvement in fuel consumption during traveling is substantially three powers of the factor of improvement in adhesion when considering that the components of accelerated traveling, constant speed traveling, inertial traveling, and so on are mixed under ordinary traveling conditions, which in turn lets support to the significantly excellent fuel consumption improving effect of the present invention.

The values of improvement shown in the results of actual driving test A of FIGS. 5 and 6 and the results of actual driving test B of FIGS. 7 and 8 are 64% and 77%, respectively. Of course, these values vary depending on the state (the fuel consumption, the degree of abrasion of the grounding surface of the tire, etc.) of the car before the test, the traveling environment of the car (through way, traffic congestion, rainy weather, fine weather, etc.), the driving manner (rough driving, moderate driving, etc.), and so on. However, since application of the improving agent tends to increase the adhesion under almost all conditions as shown in the above mentioned test results, the fuel consumption improving effect by the application of the improving agent of the present invention under ordinary driving conditions in which acceleration is repeated will be scarcely lower than the fuel consumption improving percentage of 19% calculated from the adhesion (sliding friction coefficient μ) to a dry road surface paved with concrete shown in the results of determination of adhesion of FIG. 3. This can be understood easily from the traveling test results shown in TABLE 2 below.

Next, the fuel consumption improving effect in an actual driving test is shown by the driving test results of TABLE 2.

Further, the fuel consumption improving effect retention time by the application of the improving agent of the present invention is shown by the effect retention time determination test results of TABLE 3.

Example 2

| | |
|---|---|
| Heterofunctional group (amino group, 1 × alkoxy group) modified silicone oil | 1.5% |
| Denatured alcohol | 98.5% |

An improving agent (viscosity: 20 cp; film viscosity: 10,000 cp; film thickness: several 10 nm) of the present invention was produced following the same procedure of Example 1 except that the fine particulate silica (particle diameter: 70 nm) was not added. The thus produced improving agent was determined for adhesion (sliding friction coefficient μ) under a load of 2 kg weight by the same procedure as described in FIG. 3. The results of the determination together with the determination results for the improving agent of Example 1 and the determination results obtained under the same test conditions for a case (referred to as "Comparative Example") where no improving agent was used are shown in TABLE 4 below.

Further, the improving agent of the present example was evaluated for the film retaining force by the same procedure as that for the determination of adhesion shown in FIG. 3. Specifically, a piece of a bicycle rubber tire of a grounding surface area of 1.79 cm$^2$ was attached to a lower surface of a weight such that the grounding surface of the piece faces outside; the improving agent of the present invention was then applied to the grounding surface; the weight was forced to repeatedly slide on a dry road surface paved with concrete for a distance of 20 cm under a load of 2 kg weight such that the grounding surface was in contact with the road surface; and the number of sliding at which the improving agent film was peeled off was determined. The determination results together with those for the improving agent of Example 1 are shown in TABLE 5. Incidentally, as to Example 1 in TABLE 5, the number of sliding at which the antislipping agent in the film was peeled off was also shown.

As is seen from TABLES 4 and 5, the improving agent of the present example showed the adhesion which was the same as Example 1 for a dry road surface, was a little smaller than Example 1 for a wet road surface, and was the same as Comparative Example for a wet, frozen road surface, and showed the film retaining force which was the same as Example 1.

Example 3

| | |
|---|---|
| Heterofunctional group (amino group, 1 × alkoxy group) modified silicone oil | 1.42% |
| Fine particulate silica (particle diameter: 300 nm) | 3.77% |
| Denatured alcohol | 94.81% |

An improving agent (viscosity: 50 cp; film viscosity: 10,000 cp; film thickness: several 10 nm) of the present invention was produced following the same procedure of Example 1 except that fine particulate silica (particle diameter: 300 nm) was used in the place of the fine particulate silica (particle diameter: 70 nm). The thus produced improving agent was determined for adhesion by the same procedure as Example 2.

As is seen from TABLES 4 and 5, the improving agent of the present example showed the adhesion which was the same as Example 1 for a dry road surface, was a little smaller than Example 1 for a wet road surface, and was the same as Example 1 for a wet, frozen road surface, and showed the retaining force which was smaller than Example 1 for the antislipping agent and was the same as Example 1 for the film.

Example 4

| | |
|---|---|
| Heterofunctional group (amino group, 1 × alkoxy group) modified silicone oil | 1.42% |
| Fine particulate alumina (particle diameter: 300 nm) | 3.77% |
| Denatured alcohol | 94.81% |

An improving agent (viscosity: 50 cp; film viscosity: 10,000 cp; film thickness: several 10 nm) of the present invention was produced following the same procedure of Example 1 except that fine particulate alumina (particle diameter: 300 nm) was used in the place of the fine particulate silica (particle diameter: 70 nm). The thus produced improving agent was determined for adhesion by the same procedure as Example 2.

As is seen from TABLES 4 and 5, the improving agent of the present example showed the adhesion which was the same as Example 1 for a dry road surface, was a little smaller than Example 1 for a wet road surface, and was the same as Example 1 for a wet, frozen road surface, and showed the retaining force which was smaller than Example 1 for the antislipping agent and was the same as Example 1 for the film.

Example 5

| | |
|---|---|
| Heterofunctional group (amino group, 2 × alkoxy group) modified silicone oil | 1.42% |
| Fine particulate silica (particle diameter: 70 nm) | 3.77% |
| Isopropyl alcohol | 94.81% |

An improving agent (viscosity: 30 cp; film viscosity: 20,000 cp; film thickness: several 10 nm) of the present invention was produced following the same procedure of Example 1 except that heterofunctional group (amino group, 2× alkoxy group) modified silicone oil (viscosity: 8,000 cp) was used in the place of the heterofunctional group (amino group, 1× alkoxy group) modified silicone oil and isopropyl alcohol was used in the place of the denatured alcohol. The thus produced improving agent was determined for adhesion by the same procedure as Example 2.

As is seen from TABLES 4 and 5, the improving agent of the present example showed the adhesion which was the same as Example 1 for a dry road surface, was a little smaller than Example 1 for a wet road surface, and was the same as Example 1 for a wet, frozen road surface, and showed the retaining force which was the same as Example 1 for the antislipping agent and was a little smaller than Example 1 for the film.

Example 6

| | |
|---|---|
| Heterofunctional group (amino group, 1 × alkoxy group) modified silicone oil | 0.35% |
| Amino-denatured silicone oil | 1.23% |
| 90% Acetic acid | 0.06% |
| Methyl alcohol | 98.36% |

An improving agent (viscosity: 20 cp; film viscosity: 10,000 cp; film thickness: several 10 nm) of the present invention was produced by adding amino-denatured silicone oil to the heterofunctional group (amino group, 1× alkoxy group) modified silicone oil used in Example 1, adding 90% acetic acid thereto to form a colloidal liquid, and diluting the liquid with methyl alcohol. The thus produced improving agent was determined for adhesion by the same procedure as Example 2.

As is seen from TABLES 4 and 5, the improving agent of the present example showed the adhesion which was a little smaller than Example 1 for a dry road surface, was a little smaller than Example 1 for a wet road surface, and was the same as Comparative Example 1 for a wet, frozen road surface, and showed the film retaining force which was the same as Example 1.

Example 7

| Modified polyurethane | 1.42% |
|---|---|
| Fine particulate silica (particle diameter: 70 nm) | 3.77% |
| Isopropyl alcohol | 94.81% |

An improving agent (viscosity: 30 cp; film viscosity: 40,000 cp; film thickness: several 10 nm) of the present invention was produced following the same procedure of Example 1 except that modified polyurethane (viscosity: 20,000 cp) was used in the place of the heterofunctional group (amino group, 1× alkoxy group) modified silicone oil and isopropyl alcohol was used in the place of the denatured alcohol. The thus produced improving agent was determined for adhesion by the same procedure as Example 2.

As a result, it was confirmed that the viscosity of the modified polyurethane became about 40,000 cp by condensation action after the application to the grounding surface. Therefore, as is seen from TABLES 4 and 5, the improving agent of the present example showed the adhesion which was a little smaller than Example 1 for a dry road surface, was also a little smaller than Example 1 for a wet road surface, and was the same as Example 1 for a wet, frozen road surface, and showed the retaining force which was the same as Example 1 for the antislipping agent and was a little smaller than Example 1 for the film.

Example 8

| Modified chloroprene rubber | 1.42% |
|---|---|
| Fine particulate silica (particle diameter: 70 nm) | 3.77% |
| Cyclohexane | 94.81% |

An improving agent (viscosity: 30 cp; film viscosity: 40,000 cp; film thickness: several 10 nm) of the present invention was produced following the same procedure of Example 1 except that modified chloroprene rubber (viscosity: 80,000 cp) was used in the place of the heterofunctional group (amino group, 1× alkoxy group) modified silicone oil and cyclohexane was used in the place of the denatured alcohol. The thus produced improving agent was determined for adhesion by the same procedure as Example 2.

As is seen from TABLES 4 and 5, the improving agent of the present example showed the adhesion which was a little smaller than Example 1 for a dry road surface, was also a little smaller than Example 1 for a wet road surface, and was the same as Example 1 for a wet, frozen road surface, and showed the retaining force which was the same as Example 1 for the antislipping agent and was a little smaller than Example 1 for the film.

As described above, according to the present invention, only by provision of the improving agent by application, coating, etc., the flexible thin film strongly adhering a grounding surface of a tire, shoes, etc. and/or the fine particles of the antislipping agent strongly adhering to the surface of ground and having peripheral surfaces not wholly covered with the flexible thin film provide a film free from hysteresis loss or slip loss and exhibit adhesion improving effect depending on the state of the road surface independently of the state of the grounding surface of the tire, shoes, etc., so that extremely high energy consumption efficiency improving effect is exhibited.

Further, since the improving agent strongly adhering to the surface forms a thin film that is very nearly to liquid, the film will not be peeled off by a large load from the road surface during driving, walking or running and will exhibit the energy consumption efficiency improving effect for a surprisingly long period of time.

Moreover, the object of use of the present improving agent is not limited to a tire, shoes, etc. made of a soft rubber or other soft solid material, or a pneumatic soft rubber or other pneumatic rubbery elastic body, and applying the present agent to a grounding surface of an object made of a hard rubber or other hard solid material, or a pneumatic hard rubber or other pneumatic hard solid material having a very small rolling resistance such as hysteresis loss results in provision of an article having an extremely small rolling resistance and an extremely large adhesion, which provides a very excellent fuel consumption hitherto not conceived.

The effect of the improving agent of the present invention utilizes adhesion after its application, namely slip resistance. Therefore, when applied with a blush, spray, etc. to a grounding surface of a tire, shoes, etc. or to a surface with which a grounding surface of a tire, shoes, etc. is to be brought into contact, extremely high slip resistance can be attained rapidly and easily for a long period of time, during movement in natural environment such as car driving or man's walking or running on a slippery dry road surface, metal plate surface, or man's working, walking or running on a floor of a building, deck of a ship, steel flame or plate of a construction spot, or the like.

TABLE 1

Total Improving Effect of Fuel Consumption

| Type of Test Car | NISSAN MARCH (E-K11) | NISSAN PRIMERA (E-P11) |
|---|---|---|
| Engine Swept Volume | 1000 cc | 1800 cc |
| Year of Production | 1998 | 1997 |
| Setting | Automatically air conditioned at maximum level; Car audio system turned on; Ordinary grounding surface area of tires; Fuel consumption ca. 10 km/l; Driving range of automatic gear shifting | Automatically air conditioned at maximum level; Car audio system turned on; Large grounding surface area of tires; Fuel consumption ca. 9 km/l; Drive range of automatic gear shifting |
| Improvement of fuel consumption (Times) | | |
| 1. Traveling time[*1] | 1.21 | 1.20 |
| 2. Traveling distance[*2] | 1.16 | 1.11 |
| 3. Number of accelerator operations[*3] | 1.18 | 1.21 |

TABLE 1-continued

Total Improving Effect of Fuel Consumption

| Type of Test Car | NISSAN MARCH (E-K11) | NISSAN PRIMERA (E-P11) |
|---|---|---|
| Total improvement in fuel consumption (Times) | 1.21 × 1.16 × 1.18 = 1.64 | 1.20 × 1.11 × 1.21 = 1.77 |
| Driving conditions | Somewhat rough driving on dry road surface in city | Somewhat rough driving on dry road surface in city |
| Driver's comment | Wheel sipping did not occur after application. | Wheel slipping did not occur after application: Acceleration improved after application |

Note:
1) The improving agent was applied only to driving wheel tires.
2) *1"Traveling time" means the extension (i.e., improvement) of traveling time given by one operation of accelerator.
3) *2"Traveling distance" means the extension (i.e., improvement) of traveling distance given by one operation of accelerator.
4) *3"Number of accelerator operations" means the reduction of number of accelerator operations resulting from extension of traveling distance.
5) The unit "times" means the ratio (or magnification) of the data when the improving agent was applied to the data when not applied.
The same applies to TABLE 2.

TABLE 2

Driving Test Results

| Type of Car | TOYOTA CORTENA WAGON | HONDA CIVIC | TOYOTA ESTIMA |
|---|---|---|---|
| Year of Production | 1998 | 1993 | 2000 |
| Engine Swept Volume | 1800 cc | 1600 cc | 2400 cc |
| Setting | Front wheel driving; Drive range of automatic gear shifting; Car audio system turned on; Automatically air conditioned at maximum level; Not worn tire surface with ordinary area; Ordinary fuel consumption (ca. 9 km/l) | Front wheel driving; Drive range of automatic gear shifting; Car audio system not equipped; Automatically air conditioned at maximum level; Worn tire surface with ordinary area; Poor fuel consumption (6–7 km/l) | Front wheel driving; Drive range of automatic gear shifting; Car audio system turned on; Automatically air conditioned at maximum level; Not worn tire surface with large area; Ordinary fuel consumption (ca. 11 km/l) |
| Driver | A | B | C |
| Driving Manner | Somewhat rough | Somewhat rough | Moderate |
| Date | June 11 to June 12, 2000 | June 3 to June 4, 2000 | June 17 to June 18, 2000 |
| Weather | Fine | Fine | Almost fine |
| State of road surface | Dry, concrete-paved road | Dry, concrete-paved road | Dry, concrete-paved road |

| Scale of fuel consumption meter | Travelling distance (km) | | | Travelling distance (km) | | | Travelling distance (km) | | |
|---|---|---|---|---|---|---|---|---|---|
| | Before | After | Times | Before | After | Times | Before | After | Times |
| 0 | 0.0 | 0.0 | | 0.0 | 0.0 | | 0.0 | 0.0 | |
| 1 | 81.0 | 125.3 | 1.55 | 18.0 | 62.0 | 3.44 | 66.0 | 92.0 | 1.39 |
| 2 | 120.0 | 188.0 | 1.57 | 26.0 | 72.0 | 2.77 | | | |
| 3 | | | | 36.0 | 114.0 | 3.17 | | | |

| | | | |
|---|---|---|---|
| Average times of improvement | 1.57 | 3.17 | 1.39 |
| Driver's comment | | After application, acceleration improved; wheel slipping became difficult to occur; fuel consumption significantly improved. | |

Note:
The improving agent was applied only to driving wheel tires.

TABLE 3

Test Results of Retention Time of Fuel Consumption and Energy Consumption Improving Effect

| Object | Front wheel driving 2000 cc sedan | Men's leather shoes | Bicycle |
|---|---|---|---|
| Applied portion | Grounding surfaces of two front wheel tires | Grounding surfaces of soles | Grounding surfaces of front and rear wheel tires |
| Retention Time | Traveling distance of at least 1,600 km; at least one month at 20 km traveling per day | at least one month at 5 km walking per day | at least one month at 5 km walking per day |

TABLE 4

Results of Determination of Adhesion (Sliding Friction Coefficient µ)

| | Improving Agent | Wet, Frozen Road Surface | Wet Road Surface | Dry Road Surface |
|---|---|---|---|---|
| 1 | Not used | 0.05 | 0.52 | 0.65 |
| 2 | Example 1 | 0.25 | 0.67 | 0.80 |
| 3 | Example 2 | 0.05 | 0.57 | 0.80 |
| 4 | Example 3 | 0.25 | 0.62 | 0.80 |
| 5 | Example 4 | 0.25 | 0.62 | 0.80 |
| 6 | Example 5 | 0.25 | 0.57 | 0.80 |
| 7 | Example 6 | 0.05 | 0.57 | 0.75 |
| 8 | Example 7 | 0.25 | 0.67 | 0.75 |
| 9 | Example 8 | 0.25 | 0.62 | 0.75 |

TABLE 5

Results of Determination of Film Retaining Force (Unit: Number of times)

| | Improving Agent | Antislipping Agent | Film |
|---|---|---|---|
| 1 | Example 1 | 10 | 15 |
| 2 | Example 2 | — | 15 |
| 3 | Example 3 | 3 | 15 |
| 4 | Example 4 | 3 | 15 |
| 5 | Example 5 | 10 | 10 |
| 6 | Example 6 | — | 15 |
| 7 | Example 7 | 10 | 10 |
| 8 | Example 8 | 10 | 10 |

What is claimed is:

1. An article with improved energy consumption efficiency, comprising a contact surface including a flexible film formed thereon, the film having a thickness of 0.01 to 10 µm and a viscosity of 100,000 cp or less, the film containing antislipping agents, the antislipping agents consisting of fine particles of an average particle diameter of 10 µm or less, the film comprising heterofunctional group modified silicone containing amino groups and alkoxy groups; wherein the article is a rubber tire.

2. The article of claim 1, wherein at least a portion of the antislipping agent is partially exposed throughout a surface of the film, regardless of whether the film has been brought into direct contact with another surface.

3. The article according to claim 1, wherein the antislipping agent is mainly comprised of at least one chosen from the group consisting of silicon oxide, aluminum oxide, cerium oxide, silicon carbide, and a finely particulate organic material.

4. The article of claim 1 wherein the viscosity of said film is 10,000 to 100,000 cp.

5. The article of claim 4 wherein said viscosity is 10,000 to 50,000 cp.

6. The article of claim 5 wherein said viscosity is 10,000 to 20,000 cp.

7. The article of claim 1 wherein the thickness of the film is 0.01 to 1 µm.

8. The article of claim 7, wherein said thickness is 0.01 to 0.1 µm.

9. The article of claim 1 wherein said average particle diameter is 10 nm to 10 µm.

10. The article of claim 9 wherein said diameter is 10 nm to 1 µm.

11. The article of claim 10 wherein said diameter is 10 to 100 nm.

* * * * *